(12) United States Patent
Smith, III (10) Patent No.: US 8,075,025 B2
(45) Date of Patent: Dec. 13, 2011

(54) PROBE SEAL HAVING PRESSURE-ENERGIZED SEALING ELEMENTS FOR FEMALE HYDRAULIC COUPLING MEMBER

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 600 days.

(21) Appl. No.: 12/134,939

(22) Filed: Jun. 6, 2008

(65) Prior Publication Data

US 2009/0273144 A1 Nov. 5, 2009

Related U.S. Application Data

(63) Continuation-in-part of application No. 12/113,772, filed on May 1, 2008.

(51) Int. Cl.
*F16L 17/00* (2006.01)

(52) U.S. Cl. ............. 285/374; 285/110; 137/614.04; 277/615; 277/648

(58) Field of Classification Search .......... 285/374, 285/109, 110, 111, 112; 137/614.04; 277/612, 277/615, 626, 648, 644
See application file for complete search history.

(56) References Cited

U.S. PATENT DOCUMENTS

| | | | | |
|---|---|---|---|---|
| 2,751,235 | A | * | 6/1956 | Watts et al. ............. 285/111 |
| 2,754,136 | A | * | 7/1956 | Phillips ................. 285/112 |
| 3,124,367 | A | * | 3/1964 | Kaynor ................. 277/615 |
| 4,190,259 | A | | 2/1980 | Zitting |
| 4,350,350 | A | * | 9/1982 | Blakeley .............. 285/112 |
| 4,900,071 | A | | 2/1990 | Smith, III |
| 5,052,439 | A | | 10/1991 | Smith, III |
| 5,058,906 | A | * | 10/1991 | Adamek et al. ........ 285/112 |
| 5,099,882 | A | | 3/1992 | Smith, III |
| 5,203,374 | A | | 4/1993 | Smith, III |
| 5,390,702 | A | | 2/1995 | Smith, III |
| 6,123,103 | A | | 9/2000 | Smith, III. |
| 6,179,002 | B1 | | 1/2001 | Smith, III |
| 6,206,040 | B1 | | 3/2001 | Smith, III |
| 6,575,430 | B1 | | 6/2003 | Smith, III |
| 7,063,328 | B2 | | 6/2006 | Smith, III |

* cited by examiner

*Primary Examiner* — David E Bochna
(74) *Attorney, Agent, or Firm* — Wong, Cabello, Lutsch, Rutherford & Brucculeri, L.L.P.

(57) ABSTRACT

A crown-type probe seal for a female hydraulic coupling member has one or more pressure-energized seals for sealing between the probe seal and the body of the coupling member which retains the probe seal. The generally ring-shaped probe seal has one or more annular fluid chambers in the wall of the seal's body. Each annular fluid chamber is open to the outer circumference of the probe seal. Hydraulic fluid under pressure may enter an annular fluid chamber through its opening and exert a generally radial force as a result of a pressure differential. This radial force can act to increase the sealing effectiveness of the probe seal both to the body of the coupling member retaining the probe seal and to the probe of a male coupling member inserted in the receiving chamber of the female member.

7 Claims, 5 Drawing Sheets

PROBE SEAL HAVING PRESSURE-ENERGIZED SEALING ELEMENTS FOR FEMALE HYDRAULIC COUPLING MEMBER

CROSS-REFERENCE TO RELATED APPLICATIONS

This application is a continuation-in-part of U.S. patent application Ser. No. 12/113,772 filed May 1, 2008, the disclosure of which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to high-pressure, female coupling members for subsea use in oil and gas exploration and production applications.

2. Description of the Related Art Including Information Disclosed Under 37 CFR 1.97 and 1.98.

A wide variety of hydraulic coupling members are known in the art. Typically, a coupling is comprised of two members—a male member having a generally cylindrical probe and a female member having a receiving chamber equipped with one or more seals for providing a fluid-tight radial seal with the outer surface of the probe element of the male member.

For high-temperature, high-pressure applications, a probe seal having a dovetail interlocking fit with a seal retainer or seal cartridge in a female coupling member has proven to be a particularly effective configuration.

U.S. Pat. Nos. 5,099,882 and 5,203,374 disclose a pressure balanced hydraulic coupling with a variety of seals having a dovetail interlocking fit that prevents radial movement of the seal into the bore. This pressure balanced coupling has radial passageways communicating between the male and female members such that substantial fluid pressure is not exerted against the face of either member during coupling or uncoupling or during the coupled state. Radial passageways in the male and female members match up at their longitudinal surfaces so that fluid pressure between the male and female members is in a substantially radial direction and is not exerted at the face of either member. A first pair of seals is positioned on each side of the radial passage for sealing between the receiving chamber and the seal retainer. A second pair of seals is positioned on each side of the radial passage for sealing between the seal retainer and the male member.

U.S. Pat. No. 5,390,702 discloses an undersea hydraulic coupling having a male member with a stepped outer body that is inserted into a female member having a bore with stepped internal cylindrical surface. The step in the male member defines first and second external cylindrical surfaces which are slidably received in the female member bore and in a sleeve member before the seals, which are retained by the sleeve member, engage the male member. Thus, the male member is more accurately positioned and guided into the seals, insuring greater seal reliability and longer seal life. The stepped surfaces also help prevent implosion of the seals due to sea pressure when the end of the male member comes out of the seals.

U.S. Pat. No. 6,123,103 discloses another pressure balanced hydraulic coupling for use in undersea drilling and production operations which is equipped with dovetail type seals. The female member has a split body with a first part and a second part, each having a longitudinal passage and a radial fluid passage. A radial seal is positioned on the junction between the first and second parts of the female member body to facilitate removal and replacement of the radial seal when the split body is disassembled. The male member may be inserted through the first and second parts of the female coupling member, thereby establishing fluid communication between the coupling members in a direction transverse to the coupling member bores.

U.S. Pat. No. 6,206,040 discloses another undersea hydraulic coupling with seals having a dovetail profile. This undersea hydraulic coupling has a stepped internal bore dimensioned to increase the flow rate through the coupling is. The coupling allows an increased flow rate without increasing the size or weight of the coupling, by positioning the poppet valve in the body section, rather than in the probe section, of the male coupling member.

U.S. Pat. No. 6,575,430 discloses an undersea hydraulic coupling member having a ring-shaped seal with multiple sealing surfaces that extend inwardly from the inner surface in a radial direction. The multiple sealing surfaces help guide the probe of the male coupling member into the female member without the risk of drag or galling of the receiving chamber or metal seal retained therein. The seal has reverse inclined shoulders which provide an interlocking fit in the female member to restrain the seal from moving radially inwardly due to vacuum or low pressure in the receiving chamber.

U.S. Pat. No. 4,190,259 describes a single apex, two element fluid pressure seal assembly that has a convergingly tapered surface defining a central vertex or apex that projects radially from the seal body. The vertex creates a narrow contact dynamic seal area between the apex and the surface of an adjacent machined part. Seals of this type are available from Macrotech Polyseal, Inc. (Salt Lake City, Utah 84126) under the CROWN SEAL® brand name.

U.S. Pat. No. 6,179,002 describes an undersea hydraulic coupling with a pressure-energized dovetail seal. The seal has a pair of flexible sealing surfaces for sealing with the male and female coupling members, and a cavity therebetween that is exposed to fluid pressure in the coupling. The outer circumference of the seal has a dovetail interfit between inclined shoulders in the female member bore and on a seal retainer that holds the seal in the bore.

U.S. Pat. Nos. 5,052,439 and 4,900,071 describe an undersea hydraulic coupling which includes a male member and female member, and a two-piece retainer for restraining radial movement of a wedge-shaped annular seal into the central bore of the female member. The two-piece retainer includes a cylindrical retainer sleeve member slidably received within the female member bore, and a threaded retainer-locking member threadable to mating threads in the wall of the central bore. The retainer-locking member holds the retainer sleeve member in place within the female member bore. The annular seal is restrained from radial movement by a dovetail interlocking fit with a mating shoulder on at least one of the retainer sleeve and the retainer-locking members.

BRIEF SUMMARY OF THE INVENTION

A probe seal for a female hydraulic coupling member has one or more circumferential pressure-energized seals for sealing between the probe seal and the body of the coupling member. An annular cavity in the wall of the probe seal is open to the outer surface of the generally ring-shaped probe seal. Hydraulic fluid, under pressure, enters the annular cavity through the opening and exerts a radial force on sealing elements. In certain preferred embodiments, the annular cavity is generally L-shaped in cross section; in other preferred embodiments, the annular cavity is generally T-shaped in cross section. In some embodiments, a pressure differential is also used to impart an inwardly-directed radial force to the crown seal.

DETAILED DESCRIPTION OF THE INVENTION

Figure 1:
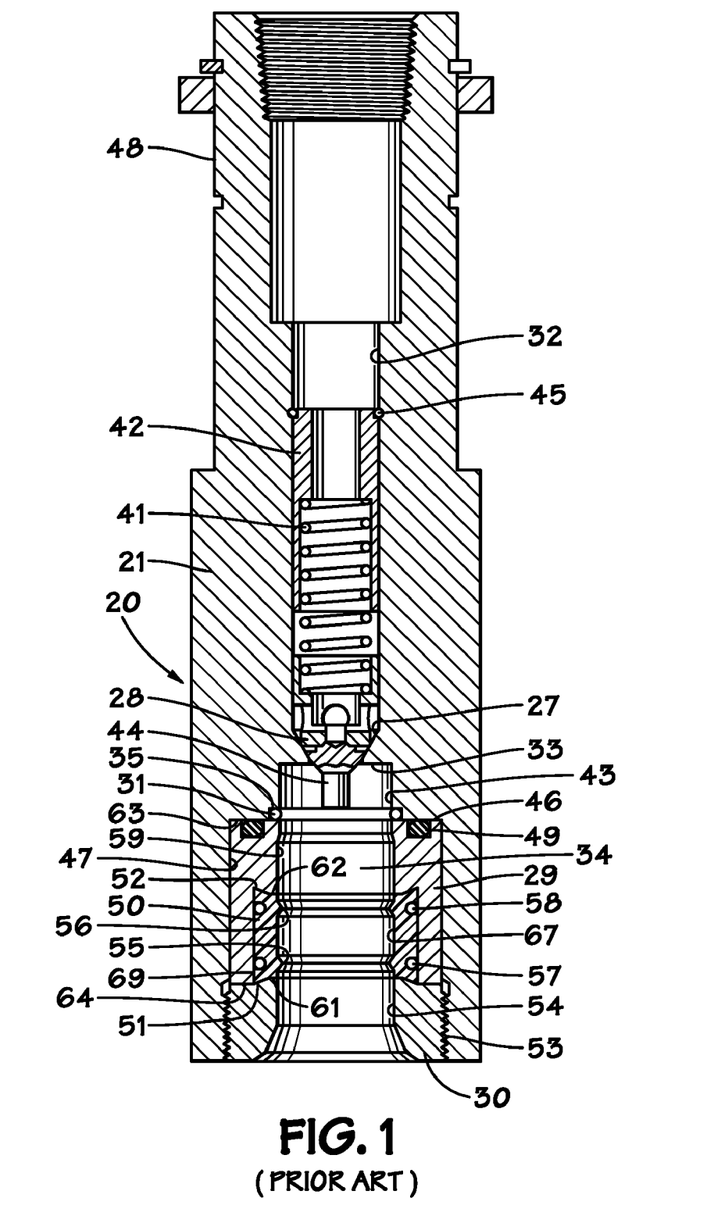
FIG. 1 is a cross-sectional view of female hydraulic coupling equipped with a probe seal of the prior art.

As shown in FIG. 1, in a coupling of the prior art, female member 20 comprises body 21, handle 48 which may be threaded to a manifold plate, and central bore 32 which has several variations in its diameter as it extends through the female member. The first end of the bore may be internally threaded for connection to a hydraulic line. Other connection means known in the art may be utilized including welding, swaging, compression fittings, and the like. A cylindrical passageway extends longitudinally within the female member body and terminates at valve seat 27. Adjacent valve seat 27 is shoulder 33 which forms one end of receiving chamber 34.

In the coupling illustrated in FIG. 1, the receiving chamber which receives the probe of the male member has a stepped internal diameter with internal shoulders 33, 35 and 63. The receiving chamber has a first smaller diameter 43 and a second larger diameter 47.

The female member 20 may include optional poppet valve 28 which is sized to slide within the cylindrical passageway. The poppet valve may be conical in shape and is urged by valve spring 41 into a seated position against valve seat 27. When the poppet valve is in a closed position against the valve seat, it seals fluid from flowing between the male member and the female member. Hollow spring collar 42 anchors the valve spring 41 and is held in place by collar clip 45. Actuator 44 extends from the apex of the poppet valve.

Ring shaped seal 50 is positioned in the receiving chamber of the female member. The ring shaped seal may be an elastomer or polymer seal that is flexible and resilient. In other embodiments, seal 50 may be fabricated from an engineering plastic such as polyetheretherketone (PEEK). Seal 50 has a first inclined shoulder surface 52 and a second inclined shoulder surface 51. The axial thickness of the elastomeric seal at its outer circumference (adjacent element 69 in FIG. 1) is greater than the axial thickness of the seal at inner circumference 67. The seal thus has a generally wedge-shaped cross section. Seal 50 may have one or more radial sealing surfaces 55, 56 extending inwardly from the seal's inner circumference 67. Each of the radial sealing surfaces extends inwardly from the inner circumference so as to engage the probe of the male member when the probe is inserted through the seal. The radial sealing surfaces may be elastically deformed by the probe when it is inserted through the seal. The radial sealing surfaces 55 and 56 provide guide points to help align and guide the probe of the male member when it is inserted through the seal and into the receiving chamber 34.

In the female coupling member illustrated in FIG. 1, the seal has grooves in its outer circumference 66. O-rings 57, 58 or similar seals may be positioned in each of the grooves. Alternatively, seal 50 may have a plurality of integral sealing projections which extend from its outer circumference.

In the female coupling member shown in FIG. 1, implosion of the seal into the receiving chamber due to low pressure or vacuum is resisted because the seal has an interlocking fit with reverse inclined shoulder surface 62 of seal retainer 29 and reverse inclined shoulder surface 61 of locking member 30. The seal retainer may be a cylindrical sleeve that slides into the second diameter 47 of the receiving chamber. Alternatively, the seal retainer may be threaded to the female member or engaged to the female member by other means. In the illustrated coupling, when the seal retainer is fully engaged with the female member, first end 46 of the seal retainer abuts shoulder 63. The seal retainer holds hollow radial metal seal 31 on internal shoulder 35.

In the illustrated female coupling member, the seal retainer has a first internal circumferential surface 59 adjacent the first end thereof and a second internal circumferential surface 69 adjacent the second end thereof. The internal diameter of the first inner circumferential surface is smaller than the internal diameter of the second internal circumferential surface. Reverse inclined shoulder 62 is situated between the first and second internal circumferential surfaces. The reverse inclined shoulder has an interlocking fit with seal 50 to restrain the seal from moving inwardly in a radial direction. O-ring 49 is positioned in a groove at the first end 46 of the seal retainer to provide a face-type seal between the seal retainer and shoulder 63.

In the illustrated coupling, locking member 30 engages the female coupling member with threads 53. Other engaging means known in the art may be used. When the locking member is fully secured to the female coupling member, first end 64 abuts seal retainer 29 and holds the seal retainer in place. The locking member 30 has a central opening with an internal diameter 54 that allows insertion of the probe of the male member. Reverse inclined shoulder surface 61 holds seal 50 in place and restrains the seal from moving inward in a radial direction.

Figures 2A, 2B, 3:
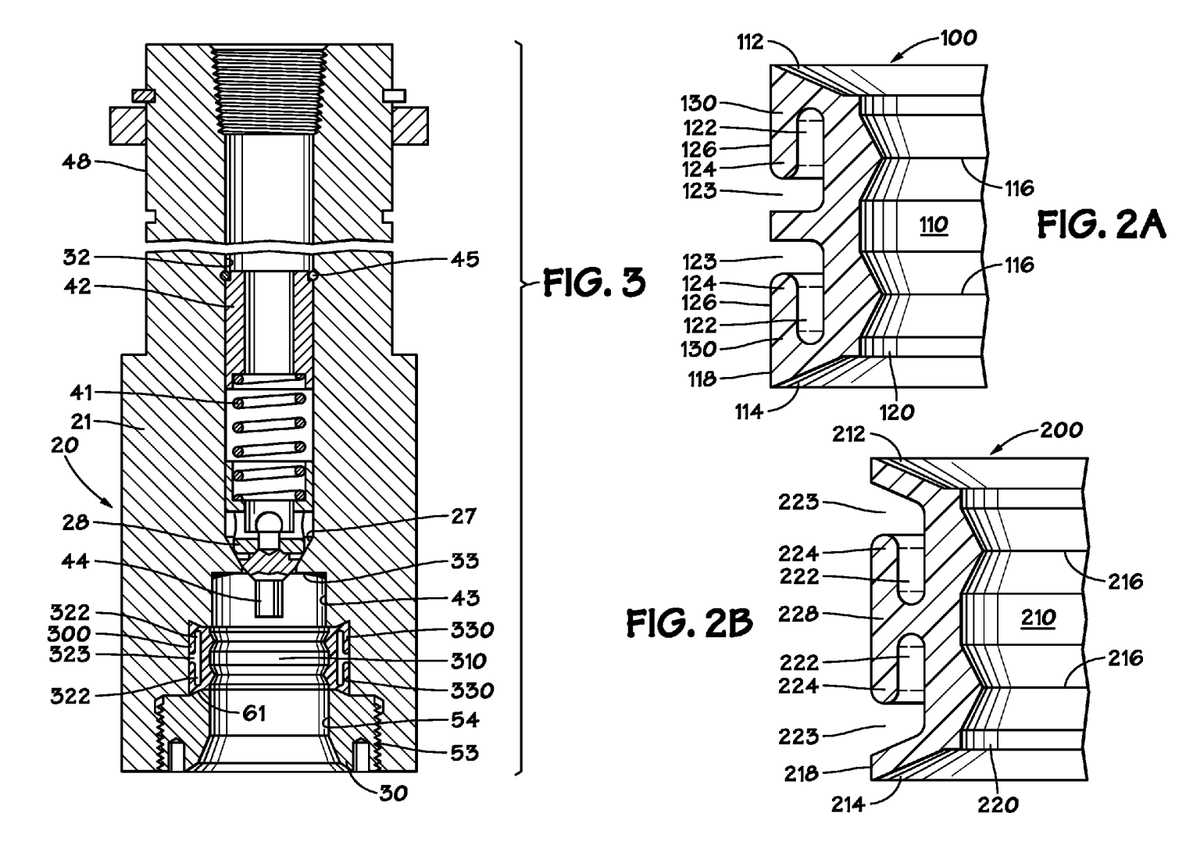
FIG. 2A is a cross-sectional view of a pressure-energized probe seal according to a first embodiment.
FIG. 2B is a cross-sectional view of a pressure-energized probe seal according to a second embodiment.
FIG. 3 is a cross-sectional view of a female hydraulic coupling member equipped with a pressure-energized probe seal according to the embodiment illustrated in FIG. 2D.

The invention may best be understood by reference to particular embodiments. FIG. 2A shows a probe seal according to a first embodiment of the invention. Probe seal 100 comprises ring-shaped body 110 having beveled shoulder 112 on a first end thereof and opposing beveled shoulder 114 on a second end. Beveled shoulders 112 and 114 enable probe seal 100 to have a dovetail interlocking fit with the body, seal retainer or seal cartridge of a female hydraulic coupling member such as that illustrated in FIG. 1. The dovetail interlocking fit resists inward radial movement of probe seal 100 in response to reduced pressure in the receiving chamber of the female coupling member such as may occur during withdrawal of the probe of a male coupling member.

One or more radial sealing projections 116 extend from inner circumference 120 of ring-shaped body 110 and may be sized and spaced to seal against the outer circumference of a generally cylindrical probe of a corresponding male coupling member. In the illustrated embodiments, sealing projections 116 are generally triangular in cross section. Sealing projections 116 may have other configurations including, but not limited to, pressure-energized configurations such as are disclosed in U.S. Pat. No. 6,575,430 to Robert E. Smith, III.

Outer circumference 118 of ring-shaped body 110 has a pair of high-pressure fluid chambers 122 symmetrically disposed about center section 128 and which open (at 123) to the outer, generally cylindrical surface of body 110. Hydraulic fluid, under pressure, which may leak past primary probe seal 31 can enter one or both of fluid chambers 122 through the opening at 123. Inasmuch as the distal portion of seal 100 is substantially at ambient pressure (typically, a lower pressure than that of the hydraulic fluid), a pressure differential is established which exerts an outward, radial force on the distal pressure-energized seal element 124 with distal portion 130 acting as a "living hinge" or flexure bearing. This force acts to increase the sealing effectiveness of seal 100 to seal retainer 29 by increasing the pressure on sealing surface 126. In female coupling members having a seal cartridge, the outward, radial force acts to increase the sealing effectiveness of seal 100 to the seal cartridge. In female coupling members not having a seal retainer or seal cartridge, the outward, radial force acts to increase the sealing effectiveness of seal 100 to the body of the female coupling member.

Differential pressure also acts to increase the sealing effectiveness of radial sealing projection(s) 116 against the probe element of a corresponding male coupling member. When the pressure in the receiving chamber 34 of female coupling member 20 is less than the pressure in annular fluid chambers 122, an inward radial force is imparted which acts to urge sealing projection(s) 116 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the proximal pressure-energized sealing element 124, increasing the sealing effectiveness at sealing surface 126. The symmetry of seal 100 about its midline permits its installation in a female coupling member such as the one illustrated in FIG. 1 without regard to its orientation. This feature decreases the possibility of an incorrect coupling assembly.

FIG. 2B shows a probe seal according to a second embodiment of the invention. Probe seal 200 comprises ring-shaped body 210 having beveled shoulder 212 on a first end thereof and opposing beveled shoulder 214 on a second end. Beveled shoulders 212 and 214 enable probe seal 200 to have a dovetail interlocking fit with the body, seal retainer or seal cartridge of a female hydraulic coupling member such as that illustrated in FIG. 1. The dovetail interlocking fit resists inward radial movement of probe seal 200 in response to reduced pressure in the receiving chamber of the female coupling member such as may occur during withdrawal of the probe of a male coupling member.

One or more radial sealing projections 216 extend from inner circumference 220 of ring-shaped body 210 and may be sized and spaced to seal against the outer circumference of a generally cylindrical probe of a corresponding male coupling member. In the illustrated embodiments, sealing projections 216 are generally triangular in cross section. Sealing projections 216 may have other configurations including, but not limited to, pressure-energized configurations such as are disclosed in U.S. Pat. No. 6,575,430 to Robert E. Smith, III.

Outer circumference 218 of ring-shaped body 210 has a pair of high-pressure fluid chambers 222 symmetrically disposed about center section 228 and which open (at 223) to the outer, generally cylindrical surface of body 210. Hydraulic fluid, under pressure, which may leak past primary probe seal 31 can enter one or both of fluid chambers 222 through the opening at 223. Inasmuch as the distal portion of seal 200 is substantially at ambient pressure (typically, a lower pressure than that of the hydraulic fluid), a pressure differential is established which exerts an outward, radial force on the distal pressure-energized seal element 224 with proximal portion 231 acting as a "living hinge" or flexure bearing. This force acts to increase the sealing effectiveness of seal 200 to seal retainer 29 by increasing the pressure on sealing surface 226. In female coupling members having a seal cartridge, the outward, radial force acts to increase the sealing effectiveness of seal 200 to the seal cartridge. In female coupling members not having a seal retainer or seal cartridge, the outward, radial force acts to increase the sealing effectiveness of seal 200 to the body of the female coupling member.

Differential pressure also acts to increase the sealing effectiveness of radial sealing projection(s) 216 against the probe element of a corresponding male coupling member. When the pressure in the receiving chamber 34 of female coupling member 20 is less than the pressure in fluid chambers 222, an inward radial force is imparted which acts to urge sealing projection(s) 216 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the proximal pressure-energized sealing element 224, increasing the sealing effectiveness at sealing surface 226. The symmetry of seal 200 about its midline permits its installation in a female coupling member such as the one illustrated in FIG. 1 without regard to its orientation. This feature decreases the possibility of a coupling being incorrectly assembled.

Figure 2C:
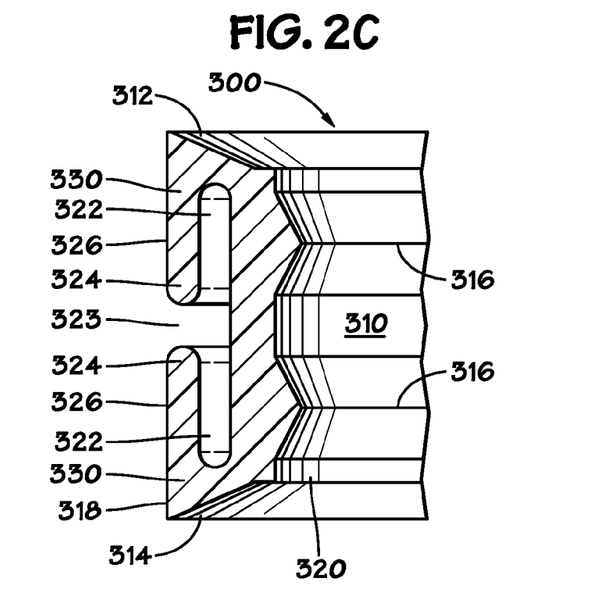
FIG. 2C is a cross-sectional view of a pressure-energized probe seal according to a third embodiment.

FIG. 2C shows a probe seal according to a third embodiment of the invention wherein the annular fluid chamber in the wall of the seal is generally T-shaped in cross section. Probe seal 300 comprises ring-shaped body 310 having beveled shoulder 312 on a first end thereof and opposing beveled shoulder 314 on a second end. Beveled shoulders 312 and 314 enable probe seal 300 to have a dovetail interlocking fit with the body, seal retainer or seal cartridge of a female hydraulic coupling member such as that illustrated in FIG. 1. The dovetail interlocking fit resists inward radial movement of probe seal 300 in response to reduced pressure in the receiving chamber of the female coupling member such as may occur during withdrawal of the probe of a male coupling member.

One or more radial sealing projections 316 extend from inner circumference 320 of ring-shaped body 310 and may be sized and spaced to seal against the outer circumference of a generally cylindrical probe of a corresponding male coupling member. In the illustrated embodiments, sealing projections 316 are generally triangular in cross section. Sealing projections 316 may have other configurations including, but not limited to, pressure-energized configurations such as are disclosed in U.S. Pat. No. 6,575,430 to Robert E. Smith, III.

The wall of ring-shaped body 310 has an annular chamber 322 with a generally T-shaped cross section for high-pressure fluid which is open (at 323) to the outer, generally cylindrical surface 318 of body 310. Hydraulic fluid, under pressure, which may leak past primary probe seal 31 can enter fluid chamber 322 through the opening at 323. Inasmuch as the distal portion of seal 300 is substantially at ambient pressure (typically, a lower pressure than that of the hydraulic fluid), a pressure differential is established which exerts an outward, radial force on the distal pressure-energized seal element 324 with portion 330 acting as a "living hinge" or flexure bearing. This force acts to increase the sealing effectiveness of seal 300 to seal retainer 29 by increasing the pressure on sealing surfaces 326. In female coupling members having a seal cartridge, the outward, radial force acts to increase the sealing effectiveness of seal 300 to the seal cartridge. In female coupling members not having a seal retainer or seal cartridge, the outward, radial force acts to increase the sealing effectiveness of seal 300 to the body of the female coupling member.

Differential pressure also acts to increase the sealing effectiveness of radial sealing projection(s) 316 against the probe element of a corresponding male coupling member. When the pressure in the receiving chamber 34 of female coupling member 20 is less than the pressure in fluid chambers 322, an inward radial force is imparted which acts to urge sealing projection(s) 316 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the proximal pressure-energized sealing element 324, increasing the sealing effectiveness at sealing surface 326. The symmetry of seal 300 about its midline permits its installation in a female coupling member such as the one illustrated in FIG. 1 without regard to its orientation. This feature decreases the possibility of a coupling being incorrectly assembled.

Figure 2D:
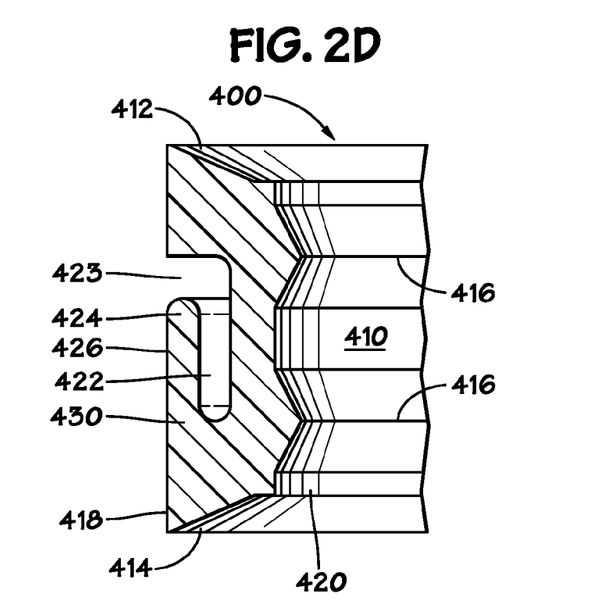
FIG. 2D is a cross-sectional view of a pressure-energized probe seal according to a fourth embodiment.

FIG. 2D depicts a fourth embodiment of the invention which is not symmetric about the midline of the seal body 410. Accordingly, seal 400 has a preferred orientation in the body of the female coupling member.

FIG. 2D shows a probe seal according to the invention which has a single annular fluid chamber 422 in the wall of the seal. The annular fluid chamber is generally L-shaped in cross section. Probe seal 400 comprises ring-shaped body 410 having beveled shoulder 412 on a first end thereof and opposing beveled shoulder 414 on a second end. Beveled shoulders 412 and 414 enable probe seal 400 to have a dovetail interlocking fit with the body, seal retainer or seal cartridge of a female hydraulic coupling member such as that illustrated in FIG. 1. The dovetail interlocking fit resists inward radial movement of probe seal 400 in response to reduced pressure in the receiving chamber of the female coupling member such as may occur during withdrawal of the probe of a male coupling member.

One or more radial sealing projections 416 extend from inner circumference 420 of ring-shaped body 410 and may be sized and spaced to seal against the outer circumference of a generally cylindrical probe of a corresponding male coupling member. In the illustrated embodiments, sealing projections 416 are generally triangular in cross section. Sealing projections 416 may have other configurations including, but not limited to, pressure-energized configurations such as are disclosed in U.S. Pat. No. 6,575,430 to Robert E. Smith, III.

The wall of ring-shaped body 410 has an annular chamber 422 with a generally L-shaped cross section for high-pressure fluid which is open (at 423) to the outer, generally cylindrical surface 418 of body 410. Hydraulic fluid, under pressure, which may leak past primary probe seal 41 can enter fluid chamber 422 through the opening at 423. Inasmuch as the distal portion of seal 400 is substantially at ambient pressure (typically, a lower pressure than that of the hydraulic fluid), a pressure differential is established which exerts an outward, radial force on the distal pressure-energized seal element 424 with portion 430 acting as a "living hinge" or flexure bearing. This force acts to increase the sealing effectiveness of seal 400 to seal retainer 29 by increasing the pressure on sealing surfaces 426. In female coupling members having a seal cartridge, the outward, radial force acts to increase the sealing effectiveness of seal 400 to the seal cartridge. In female coupling members not having a seal retainer or seal cartridge, the outward, radial force acts to increase the sealing effectiveness of seal 400 to the body of the female coupling member.

Differential pressure also acts to increase the sealing effectiveness of radial sealing projection(s) 416 against the probe element of a corresponding male coupling member. When the pressure in the receiving chamber 34 of female coupling member 20 is less than the pressure in fluid chamber 422, an inward radial force is imparted which acts to urge sealing projection(s) 416 against the surface of a male probe inserted in the receiving chamber of the female coupling.

Due to the asymmetry of annular fluid chamber 422, it is preferable that the first end of seal 400—the end nearer beveled shoulder 412—be oriented in the female coupling member towards the higher pressure side of the receiving chamber. In most female coupling members, the higher pressure side of the receiving chamber is the side closer to the middle of the coupling body. This is because opening 423 is closer to the first end of seal body 410 proximate shoulder 412 than to the second end of seal body 410 proximate shoulder 414. High pressure hydraulic fluid enters annular chamber 422 through opening 423. The pressure differential urges pressure-energized seal 424 in an outward, radial direction thereby increasing the sealing effectiveness of seal 400 at sealing surface 426. It will be appreciated that sealing surface 426 is preferably "downstream" from opening 423 thereby permitting hydraulic fluid to enter chamber 422.

An advantage of the design of seal 400 is that pressure-energized seal 424 can be longer than the corresponding element in those embodiments having multiple pressure-energized seals. The greater length (longer lever arm) of element 424 may thus provide greater flexibility for a given pressure differential. This may be of particular advantage when seal body 410 is fabricated from a stiffer material such as PEEK.

FIGS. 2E through 2H depict embodiments of the probe seal having one or more radial sealing projections on their outer circumference which may act to increase the sealing force between the probe seal and the body of the female coupling member, a seal retainer within a female coupling member or a seal cartridge in a female coupling member, as the case may be.

Figure 2E:
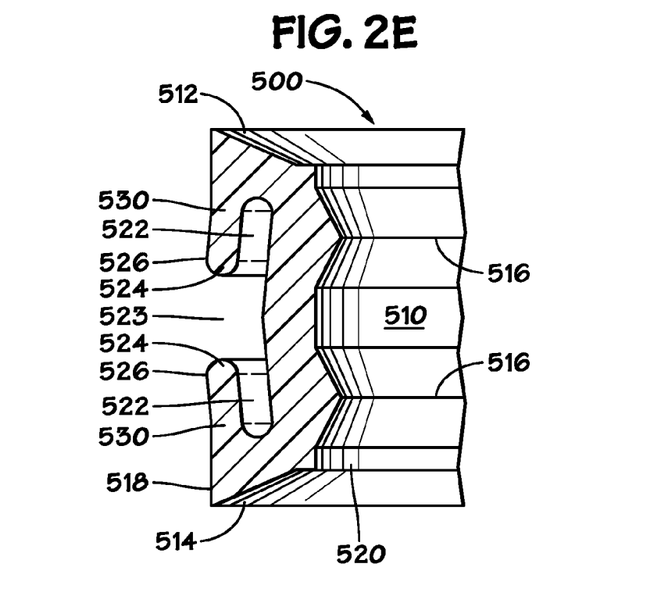
FIG. 2E is a cross-sectional view of a pressure-energized probe seal according to a fifth embodiment.

FIG. 2E shows a probe seal according to a fifth embodiment of the invention. Probe seal 500 comprises ring-shaped body 510 having beveled shoulder 512 on a first end thereof and opposing beveled shoulder 514 on a second end. Beveled shoulders 512 and 514 enable probe seal 500 to have a dovetail interlocking fit with the body, seal retainer or seal cartridge of a female hydraulic coupling member such as that illustrated in FIG. 1. The dovetail interlocking fit resists inward radial movement of probe seal 500 in response to reduced pressure in the receiving chamber of the female coupling member such as may occur during withdrawal of the probe of a male coupling member.

One or more radial sealing projections 516 extend from inner circumference 520 of ring-shaped body 510 and may be sized and spaced to seal against the outer circumference of a generally cylindrical probe of a corresponding male coupling member. In the illustrated embodiments, sealing projections 516 are generally triangular in cross section. Sealing projections 516 may have other configurations including, but not limited to, pressure-energized configurations such as are disclosed in U.S. Pat. No. 6,575,430 to Robert E. Smith, III.

Outer circumference 518 of ring-shaped body 510 has a pair of high-pressure fluid chambers 522 symmetrically disposed about the transverse centerline of body 510 and which open (at 523) to the outer, generally cylindrical surface of body 510. Hydraulic fluid, under pressure, which may leak past primary probe seal 31 can enter one or both of fluid chambers 522 through the opening at 523. Inasmuch as the distal portion of seal 500 is substantially at ambient pressure (typically, a lower pressure than that of the hydraulic fluid), a pressure differential is established which exerts an outward, radial force on the distal pressure-energized seal element 524 with distal portion 530 acting as a "living hinge" or flexure bearing. This force acts to increase the sealing effectiveness of seal 500 to seal retainer 29 by increasing the pressure on sealing surface 526. In female coupling members having a seal cartridge, the outward, radial force acts to increase the sealing effectiveness of seal 500 to the seal cartridge. In female coupling members not having a seal retainer or seal cartridge, the outward, radial force acts to increase the sealing effectiveness of seal 500 to the body of the female coupling member.

In the embodiment shown in FIG. 2E, the outer diameter of body 510 at sealing surfaces 526 is greater than the outer diameter of body 510 at 518. Stated another way, the cross-sectional, longitudinal axes of pressure-energized seal elements 524 are not parallel to the longitudinal central axis of body 5 10. It is believed that this increases the sealing pressure at 526 thereby enhancing the sealing effectiveness.

Differential pressure also acts to increase the sealing effectiveness of radial sealing projection(s) 516 against the probe element of a corresponding male coupling member. When the pressure in the receiving chamber 34 of female coupling member 20 is less than the pressure in annular fluid chambers 522, an inward radial force is imparted which acts to urge sealing projection(s) 516 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the proximal pressure-energized sealing element 524, increasing the sealing effectiveness at sealing surface 526. The symmetry of seal 500 about its midline permits its installation in a female coupling member such as the one illustrated in FIG. 1 without regard to its orientation. This feature decreases the possibility of an incorrect coupling assembly.

Figure 2F:
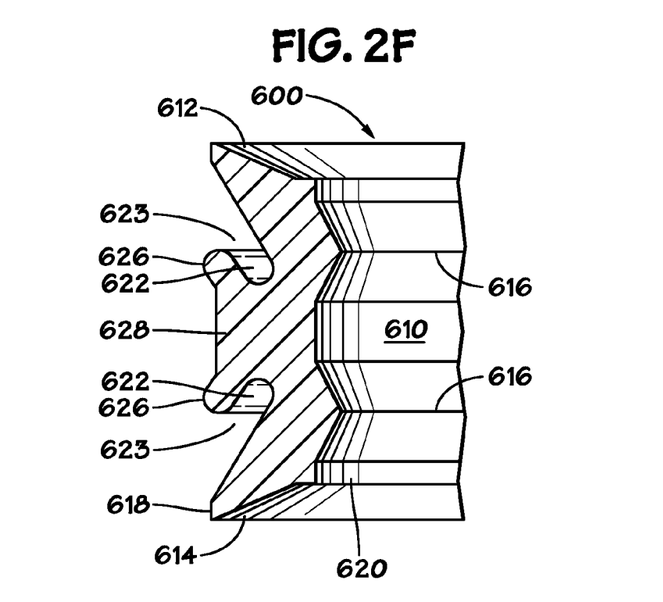
FIG. 2F is a cross-sectional view of a pressure-energized probe seal according to a sixth embodiment.

FIG. 2F shows a probe seal according to a sixth embodiment of the invention. Probe seal 600 comprises ring-shaped body 610 having beveled shoulder 612 on a first end thereof and opposing beveled shoulder 614 on a second end. Beveled shoulders 612 and 614 enable probe seal 600 to have a dovetail interlocking fit with the body, seal retainer or seal cartridge of a female hydraulic coupling member such as that illustrated in FIG. 1. The dovetail interlocking fit resists inward radial movement of probe seal 600 in response to reduced pressure in the receiving chamber of the female coupling member such as may occur during withdrawal of the probe of a male coupling member.

One or more radial sealing projections 616 extend from inner circumference 620 of ring-shaped body 610 and may be sized and spaced to seal against the outer circumference of a generally cylindrical probe of a corresponding male coupling member. In the illustrated embodiments, sealing projections 616 are generally triangular in cross section. Sealing projections 616 may have other configurations including, but not limited to, pressure-energized configurations such as are disclosed in U.S. Pat. No. 6,575,430 to Robert E. Smith, III.

Outer circumference 618 of ring-shaped body 610 has a pair of high-pressure fluid chambers 622 symmetrically disposed about center section 628 and which open (at 623) to the outer, generally cylindrical surface of body 610. Hydraulic fluid, under pressure, which may leak past primary probe seal 31 can enter one or both of fluid chambers 622 through the opening at 623. Inasmuch as the distal portion of seal 600 is substantially at ambient pressure (typically, a lower pressure than that of the hydraulic fluid), a pressure differential is established which exerts an outward, radial force against sealing lip 626. This force acts to increase the sealing effectiveness of seal 600 to seal retainer 29 by increasing the pressure In female coupling members having a seal cartridge, the outward, radial force acts to increase the sealing effectiveness of seal 600 to the seal cartridge. In female coupling members not having a seal retainer or seal cartridge, the outward, radial force acts to increase the sealing effectiveness of seal 600 to the body of the female coupling member.

In the embodiment shown in FIG. 2F, the outer diameter of body 610 at sealing surfaces 626 is greater than the outer diameter of body 610 at 618. It is believed that this increases the sealing pressure at 626 thereby enhancing the sealing effectiveness.

Differential pressure also acts to increase the sealing effectiveness of radial sealing projection(s) 616 against the probe element of a corresponding male coupling member. When the pressure in the receiving chamber 34 of female coupling member 20 is less than the pressure in annular fluid chambers 622, an inward radial force is imparted which acts to urge sealing projection(s) 616 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the other pressure-energized sealing element, increasing the sealing effectiveness at its sealing surface 626. The symmetry of seal 600 about its midline permits its installation in a female coupling member such as the one illustrated in FIG. 1 without regard to its orientation. This feature decreases the possibility of an incorrect coupling assembly.

Figure 2G:
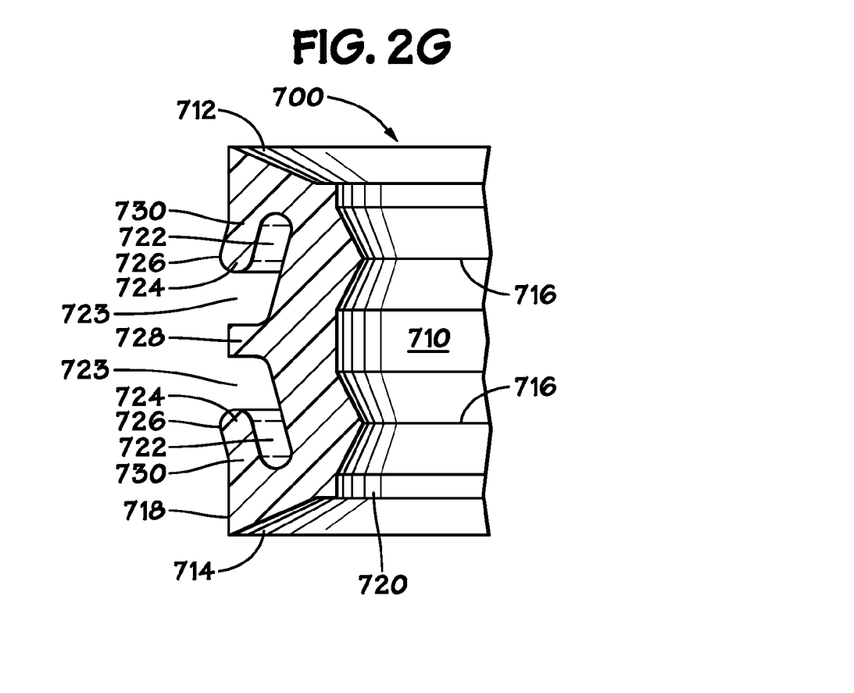
FIG. 2G is a cross-sectional view of a pressure-energized probe seal according to a seventh embodiment.

FIG. 2G shows a probe seal according to a sixth embodiment of the invention. Probe seal 700 comprises ring-shaped body 710 having beveled shoulder 712 on a first end thereof and opposing beveled shoulder 714 on a second end. Beveled shoulders 712 and 714 enable probe seal 700 to have a dovetail interlocking fit with the body, seal retainer or seal cartridge of a female hydraulic coupling member such as that illustrated in FIG. 1. The dovetail interlocking fit resists inward radial movement of probe seal 700 in response to reduced pressure in the receiving chamber of the female coupling member such as may occur during withdrawal of the probe of a male coupling member.

One or more radial sealing projections 716 extend from inner circumference 720 of ring-shaped body 710 and may be sized and spaced to seal against the outer circumference of a generally cylindrical probe of a corresponding male coupling member. In the illustrated embodiments, sealing projections 716 are generally triangular in cross section. Sealing projections 716 may have other configurations including, but not limited to, pressure-energized configurations such as are disclosed in U.S. Pat. No. 6,575,430 to Robert E. Smith, III.

Outer circumference 718 of ring-shaped body 710 has a pair of high-pressure fluid chambers 722 symmetrically disposed about center section 728 and which open (at 723) to the outer, generally cylindrical surface of body 710. Hydraulic fluid, under pressure, which may leak past primary probe seal 31 can enter one or both of fluid chambers 722 through the opening at 723. Inasmuch as the distal portion of seal 700 is substantially at ambient pressure (typically, a lower pressure than that of the hydraulic fluid), a pressure differential is established which exerts an outward, radial force on the distal pressure-energized seal element 724 with portion 730 acting as a "living hinge" or flexure bearing. This force acts to increase the sealing effectiveness of seal 700 to seal retainer 29 by increasing the pressure on sealing surface 726. In female coupling members having a seal cartridge, the outward, radial force acts to increase the sealing effectiveness of seal 700 to the seal cartridge. In female coupling members not having a seal retainer or seal cartridge, the outward, radial force acts to increase the sealing effectiveness of seal 700 to the body of the female coupling member.

In the embodiment shown in FIG. 2G, the outer diameter of body 710 at sealing surfaces 726 is greater than the outer diameter of body 710 at 718. Stated another way, the cross-sectional, longitudinal axes of pressure-energized seal elements 724 are not parallel to the longitudinal central axis of body 710. It is believed that this increases the sealing pressure at 726 thereby enhancing the sealing effectiveness.

Differential pressure also acts to increase the sealing effectiveness of radial sealing projection(s) 716 against the probe element of a corresponding male coupling member. When the pressure in the receiving chamber 34 of female coupling member 20 is less than the pressure in annular fluid chambers 722, an inward radial force is imparted which acts to urge sealing projection(s) 716 against the surface of a male probe inserted in the receiving chamber of the female coupling.

In negative pressure situations—i.e., wherein the pressure within the receiving chamber of the female coupling member is lower than the ambient pressure such as often occurs during probe withdrawal, the pressure differential creates an outward, radial force against the proximal pressure-energized sealing element 724, increasing the sealing effectiveness at sealing surface 726. The symmetry of seal 700 about its midline permits its installation in a female coupling member such as the one illustrated in FIG. 1 without regard to its orientation. This feature decreases the possibility of an incorrect coupling assembly.

Figure 2H:
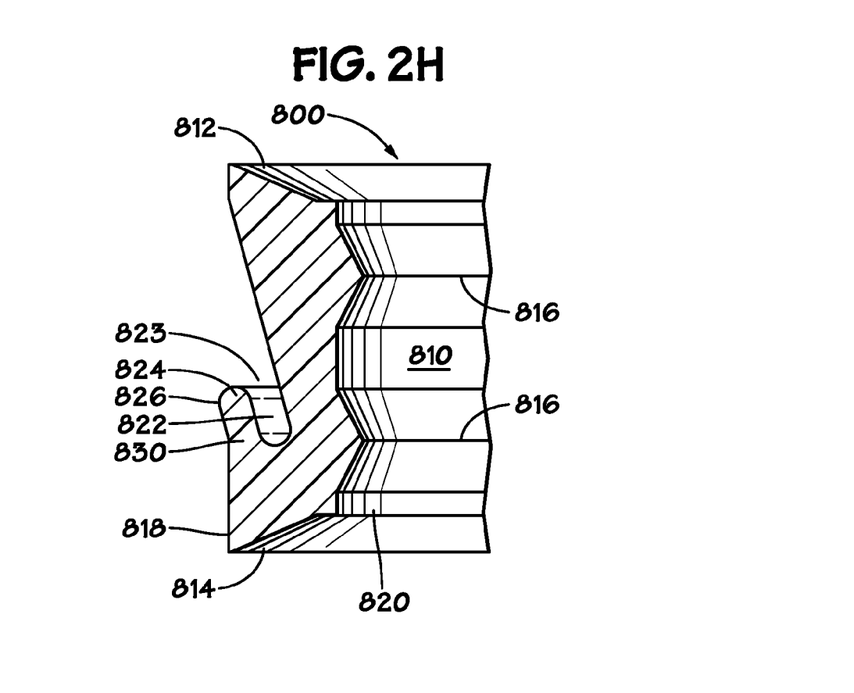
FIG. 2H is a cross-sectional view of a pressure-energized probe seal according to an eighth embodiment.

FIG. 2H depicts an eighth embodiment of the invention which is not symmetric about the midline of the seal body 810. Accordingly, seal 800 has a preferred orientation in the body of the female coupling member.

The probe seal 800 shown in FIG. 2H has a single annular fluid chamber 822 in the wall of the seal. Probe seal 800 comprises ring-shaped body 810 having beveled shoulder 812 on a first end thereof and opposing beveled shoulder 814 on a second end. Beveled shoulders 812 and 814 enable probe seal 800 to have a dovetail interlocking fit with the body, seal retainer or seal cartridge of a female hydraulic coupling member such as that illustrated in FIG. 1. The dovetail interlocking fit resists inward radial movement of probe seal 800 in response to reduced pressure in the receiving chamber of the female coupling member such as may occur during withdrawal of the probe of a male coupling member.

One or more radial sealing projections 816 extend from inner circumference 820 of ring-shaped body 810 and may be sized and spaced to seal against the outer circumference of a generally cylindrical probe of a corresponding male coupling member. In the illustrated embodiments, sealing projections 816 are generally triangular in cross section. Sealing projections 816 may have other configurations including, but not limited to, pressure-energized configurations such as are disclosed in U.S. Pat. No. 6,575,430 to Robert E. Smith, III.

The wall of ring-shaped body 810 has an annular chamber 822 which is open (at 823) to the outer, generally cylindrical surface 818 of body 810. Hydraulic fluid, under pressure, which may leak past primary probe seal 41 can enter fluid chamber 822 through the opening at 823. Inasmuch as the distal portion of seal 800 is substantially at ambient pressure (typically, a lower pressure than that of the hydraulic fluid), a pressure differential is established which exerts an outward, radial force on pressure-energized seal element 824 with portion 830 acting as a "living hinge" or flexure bearing. This force acts to increase the sealing effectiveness of seal 800 to seal retainer 29 by increasing the pressure on sealing surface 826. In female coupling members having a seal cartridge, the outward, radial force acts to increase the sealing effectiveness of seal 800 to the seal cartridge. In female coupling members not having a seal retainer or seal cartridge, the outward, radial force acts to increase the sealing effectiveness of seal 800 to the body of the female coupling member.

In the embodiment shown in FIG. 2H, the outer diameter of body 810 at sealing surface 826 is greater than the outer diameter of body 810 at 818. Stated another way, the cross-sectional, longitudinal axis of pressure-energized seal element 824 is not parallel to the longitudinal central axis of body 810. It is believed that this configuration increases the sealing pressure at 826 thereby enhancing the sealing effectiveness.

Differential pressure also acts to increase the sealing effectiveness of radial sealing projection(s) 816 against the probe element of a corresponding male coupling member. When the pressure in the receiving chamber 34 of female coupling member 20 is less than the pressure in fluid chamber 822, an inward radial force is imparted which acts to urge sealing projection(s) 816 against the surface of a male probe inserted in the receiving chamber of the female coupling.

Due to the asymmetry of annular fluid chamber 822, it is preferable that the first end of seal 800—the end nearer beveled shoulder 812—be oriented in the female coupling member towards the higher pressure side of the receiving chamber. In most female coupling members, the higher pressure side of the receiving chamber is the side closer to the middle of the coupling body. This is because opening 823 is oriented towards the first end of seal body 810 proximate shoulder 812. High pressure hydraulic fluid enters annular chamber 822 through opening 823. The pressure differential urges pressure-energized seal 824 in an outward, radial direction thereby increasing the sealing effectiveness of seal 800 at sealing surface 826. It will be appreciated that sealing surface 826 is preferably "downstream" from opening 823 thereby permitting hydraulic fluid to enter chamber 822.

FIG. 3 depicts a female coupling member 20 equipped with a probe seal 300 of the type illustrated in FIG. 2C. In the coupling illustrated in FIG. 3, female body 21 has a reverse inclined shoulder in its central bore and retainer 30 has a corresponding inclined shoulder 61 which together provide a dovetail interlocking fit with the angled shoulders on probe seal 300. Probe seals according to the present invention may also be used in female coupling members which have seal retainers (as illustrated in FIG. 1) or seal cartridges. Probe seals according to the invention may be retrofitted to female coupling members having probe seals of the prior art as illustrated in FIG. 1.

Although the invention has been described in detail with reference to certain preferred embodiments, variations and modifications exist within the scope and spirit of the invention as described and defined in the following claims.

What is claimed is:

1. A probe seal for a female hydraulic coupling member comprising:
    a generally ring-shaped polymer body having a first end, an opposing second end, a generally cylindrical outer surface and a generally cylindrical, imperforate inner surface;
    two annular chambers within the ring-shaped body between the inner surface and the outer surface;
    a fluid passageway connecting each annular chamber with the outer surface;
    two radial sealing projections extending from the outer surface;
    two radial sealing projections extending from the inner surface; and,
    wherein the probe seal is symmetric about the transverse midline of the ring-shaped body.

2. A probe seal as recited in claim 1 having a plurality of annular chambers within the ring-shaped body between the inner surface and the outer surface and a corresponding plurality of fluid passageways connecting each annular chamber with the outer surface.

3. A probe seal as recited in claim 2 wherein the plurality of annular chambers and fluid passageways are symmetrically disposed about the midline of the generally ring-shaped body.

4. A probe seal as recited in claim 3 wherein the fluid passageways are proximate the midline of the generally ring-shaped body.

5. A probe seal as recited in claim 3 wherein the fluid passageways are proximate the ends of the generally ring-shaped body.

6. A probe seal as recited in claim 2 having a plurality of radial sealing projections extending from the inner surface with each such sealing projection disposed in general radial alignment with an annular chamber.

7. A probe seal for a female hydraulic coupling member comprising:
    a generally ring-shaped polymer body having a first end, an opposing second end, a generally cylindrical outer surface and a generally cylindrical, imperforate inner surface;
    an annular chamber within the ring-shaped body between the inner surface and the outer surface;
    a fluid passageway connecting the annular chamber with the outer surface such that the annular chamber together with the fluid passageway is generally T-shaped in cross section and define a pair of axial projections which are urged in an outward, radial direction by fluid pressure within the annular chamber;
    at least one radial sealing projection extending from the outer surface; and,
    a pair of radial sealing projections extending from the inner surface with each such sealing projection extending from the inner surface disposed in general radial alignment with a branch of the T-shaped annular chamber.

* * * * *